United States Patent [19]
Camlibel et al.

[11] 3,932,160
[45] Jan. 13, 1976

[54] METHOD FOR FORMING LOW LOSS OPTICAL WAVEGUIDE FIBERS

[75] Inventors: Irfan Camlibel, Stirling; Franklin Winston Dabby, New Providence; Douglas Arthur Pinnow, Warren Township, Somerset County; LeGrand Gerard Van Uitert, Morris Township, Morris County, all of N.J.

[73] Assignees: Western Electric Company, Inc., New York, N.Y.; Bell Telephone Laboratories, Incorporated, Murray Hill, N.J.

[22] Filed: Aug. 9, 1974

[21] Appl. No.: 496,149

[52] U.S. Cl. .............. 65/3; 65/13; 65/18; 65/60; 427/163; 427/167
[51] Int. Cl.² .......................... C03C 25/02
[58] Field of Search ............ 65/3, 4, 18, 13, DIG. 7, 65/60; 264/1; 427/167, 163

[56] References Cited
UNITED STATES PATENTS

| | | | |
|---|---|---|---|
| 3,737,292 | 6/1973 | Keck et al. | 65/4 X |
| 3,775,075 | 11/1973 | Keck et al. | 65/3 |
| 3,778,132 | 12/1973 | Pinnow et al. | 65/DIG. 7 |
| 3,801,294 | 4/1974 | Schultz et al. | 65/18 |

Primary Examiner—Robert L. Lindsay, Jr.
Attorney, Agent, or Firm—G. S. Indig

[57] ABSTRACT

A method is disclosed for fabricating an optical fiber by drawing a preform whose manufacture involves the deposition of a borosilicate layer. The method calls for borosilicate deposition by high temperature pyrolysis of two gases, with processing parameters chosen so as to cause an acicular structure in the deposited layer, a structure which contributes to the uniformity of the drawn fiber.

14 Claims, 2 Drawing Figures

METHOD FOR FORMING LOW LOSS OPTICAL WAVEGUIDE FIBERS

BACKGROUND OF THE INVENTION

1. Field of the Invention

The invention is concerned with the manufacture of transmission lines for visible and near-visible electromagnetic radiation.

2. Description of the Prior Art

The emerging technology of fiber optics promises to be of commercial significance in broad bandwidth communications, a field which is currently dominated by microwave transmission. In particular, where cable space is at a premium, a significant increase in transmission capacity can potentially be realized by replacing presently used microwave carriers with hair-thin fibers carrying modulated visible or near-visible electro-magnetic radiation. In the following, such radiation (more specifically, electromagnetic radiation of a wavelength in the range of from 0.5 to 2 micrometers) will be designated as "light." For the purpose of transmitting light, glass fibers of a clad structure have been proposed. In such fibers, light guiding is effected by a decrease in refractive index from the center of the fiber outwards towards its periphery. Typically, the fiber is of a structure which comprises a core portion throughout which the refractive index is essentially constant and a cladding of a lower constant refractive index. Alternatively, a structure of graded index has been proposed in which the refractive index decreases gradually in directions away from the center line. In this latter structure the grading can be chosen so as to minimize mode dispersion when the fiber is intended for multimode use, a parabolic grading being particularly advantageous for this purpose.

A number of manufacturing processes have been proposed for the fabrication of optical fibers. For example, according to the method disclosed in U.S. Pat. No. 3,775,075 issued to Keck et al. on Nov. 27, 1973, a cylindrical fused silica rod doped, to increase its refractive index, with a material such as titanium dioxide is coated with a layer of silica soot. The resulting assembly is heated, first to sinter the soot into a glass, and then to draw the assembly into a thin fiber. Conversely, U.S. Pat. No. 3,778,132 issued to Pinnow et al. on Dec. 11, 1973, discloses an optical fiber with a core of essentially pure silica and a cladding of silica doped with a sufficient amount of boron trioxide to achieve a refractive index of at least 0.1 percent lower in the cladding as compared with that of the core. This silica-core, borosilica-clad fiber has a number of desirable features, among which are purity and homogeneity of the core material, ease of joining of fibers by heat fusing the cladding without disturbing the core, and hermetically sealing the fiber through pyrex. The latter feature is due to a close match in thermal expansion coefficients between borosilicate and pyrex and is of importance in connecting optical fibers to pyrex-encapsulated optical devices.

SUMMARY OF THE INVENTION

A method is described for manufacturing a high-grade optical fiber. The method includes a step of depositing a layer of radially positioned, needle-shaped particles of borosilicate. In part, the high quality of the resulting drawn fiber is ascribed to the acicular structure preventing the inclusion of air bubbles.

DETAILED DESCRIPTION

1. The Drawing

Figure 1:
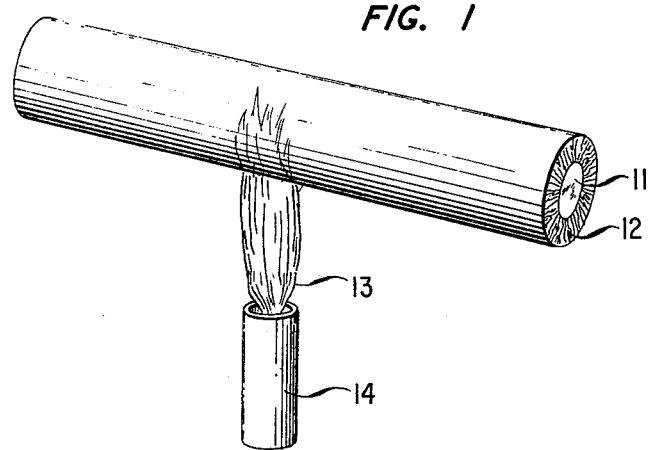
FIG. 1 shows the deposition of acicular borosilicate particles on a silica core by means of flame pyrolysis.

FIG. 1 shows silica rod 11 being coated with acicular borosilicate particles 12 by means of a process of flame pyrolysis effected by flame 13 of burner 14.

Figure 2:
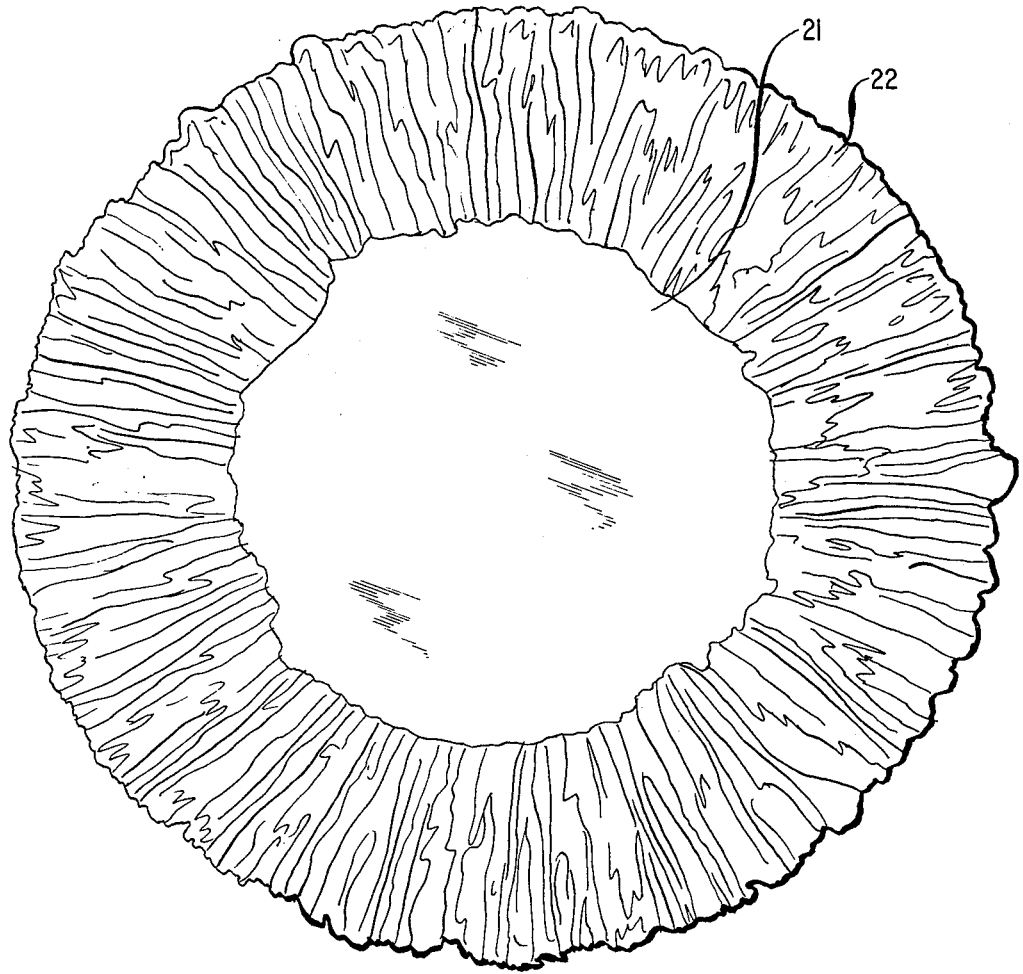
FIG. 2 is a magnified cross sectional view of the coated rod prior to fusing.

FIG. 2 shows silica core 21 covered with borosilicate 22 of an acicular structure.

2. The Method

A cylindrical rod of silica of an acceptable cross sectional roundness is flame polished at a temperature within the range of from 2,000°–2,200°C. Such polishing removes microscopic surface irregularities which could possibly serve as pinning points for tiny gas bubbles which, in turn, would act as light scattering centers at the rod-cladding interface. A borosilicate is deposited on the polished surface of the rod by high temperature pyrolysis of a mixture of silane ($SiH_4$) and borane ($B_2H_6$). For a core-clad structure which does not have a graded index the molecular ratio between these components is chosen in the range of from 6:1 to 2:1 and preferably not greater than 4:1 to achieve a suitable refractive index difference between the core and the clad. For a graded refractive index structure the molecular ratio between these components is chosen to vary over the range of 30:1 to 2:1 and preferably within the range of 9:1 to 2:1. Alternatively, silicon halides $SiCl_4$ and $SiBr_4$ and boron halides $BCl_3$ and $BBr_3$ can be used in a molecular ratio in the range of from 12:1 to 4:1 and preferably not greater than 8:1. To create the acicular structure of the borosilicate deposit, it is further required that the pyrolysis be carried out at a temperature dependent on the composition of the deposit and within the range of from 900°C to 1,200°C. Temperatures below this range lead to a deposit in the form of soot, whereas temperatures above 1,150°C cause premature fusing.

If the reactants are supplied in a proportion within the range specified, and if the temperature is within the range of from 900°–1,200°C, the deposit, when viewed in cross section, exhibits an acicular structure; that is, a structure of radially oriented needles. This acicular structure aids in the achievement of a uniform, bubble-free cladding upon fusing of the borosilicate coating which, at least in part, may be due to the ease with which air can escape during formation of the deposit as well as during fusing.

The heat necessary to maintain the reaction temperature can be supplied to the rod and the reactants in a variety of ways. For example, the pyrolysis can be carried out in a reaction furnace which heats the gases as well as the rod. Alternatively, heat may be supplied to the rod by infrared irradiation as generated by an optical source. The pyrolysis can also be carried out in a flame of burning natural gas, with enough oxygen supplied to maintain the reaction temperature.

As a means for regulating the reaction temperature, an inert carrier gas such as helium, argon, or nitrogen is beneficially employed. Helium is particularly suited for this purpose due to its high rate of diffusion through glass, a feature which largely prevents the inclusion of bubbles in the deposit.

The borosilicate deposit may be fused by firing at a temperature in the range of from 950° to 1,250°C depending upon composition. For the $3SiO_2:1B_2O_3$ composition ~ 1,075°C is convenient. For the sake of physical protection, a very thin outer layer of high silica content material, either pure silica or silica enriched borosilicate, counters the effects of thermal expansion differences and acts to immobilize the borosilicate during fiber drawing. The outer layer may be deposited subsequent to fusing the borosilicate or may result from burning $B_2O_3$ out of the surface using, for example, a gas torch.

The description above has been in terms of an effective cladding of uniform refractive index. A graded index cladding is easily achieved by varying the silane to borane ratio during deposition of the cladding material. In either case the cladding is preferably deposited without intermediate steps of fusion to avoid the creation of silica-rich layers caused by the evaporation of boron trioxide.

While the discussion above has largely been in terms of the deposition of borosilicate on an essentially pure silica rod (the former becoming the cladding and the latter the core of the drawn fiber), other arrangements are not precluded. For example, the rod may be made of doped silica, borosilica, or some other suitable glass. Also, a tube may be used instead of a rod upon which the borosilicate is deposited. Finally, the rod or tube need not become a part of the final drawn fiber as is the case in manufacturing processes calling for its removal (for example, by etching) prior to drawing of the fiber. What is essential, however, is the step of depositing an acicular layer of borosilicate glass on a suitable body of cylindrical shape and fusing the deposited layer prior to drawing into a fiber.

3. Example

Commercially available, high-purity silica rods of a diameter between 3 mm and 8 mm were flame polished and coated with a layer of acicular borosilicate particles by oxydizing a mixture of 1 part (by volume) diborane and 3 parts silane in the presence of 96 parts helium in a torch flame burning natural gas with oxygen. The thickness of the deposited acicular layer was on the order of a few millimeters. The layer was fused into a glass at a temperature of 1,075°C under helium and capped with a layer of pure silica of a thickness of approximately 0.2 mm, deposited over the fused borosilica cladding by pyrolysis of silane. The resulting assembly was drawn into a fiber of a diameter of approximately 200 micrometers.

Attenuation loss was measured at wavelengths in the range of from 0.82 to 0.88 micrometers of the $Al_{1-x}Ga_xAs$ injection laser and at the wavelength of 1.06 micrometers of the YAG:Nd laser. In the former range, attenuation loss was no greater than 5 dB/km and at the latter wavelength it was found to be no more than 3 dB/km.

What is claimed is:

1. A method for fabricating an optical fiber by means of drawing a preform whose manufacture comprises the deposition of borosilicate on a cylindrical member by means of a process of high temperature pyrolysis of a first reactant chosen from the group consisting of $SiH_4$, $SiCl_4$, and $SiBr_4$ and a second reactant chosen from the group consisting of $B_2H_6$, $BCl_3$, and $BBr_3$, heating said preform to the fusing temperature of said deposited borosilicate layer, further heating said preform to the drawing temperature, and drawing said preform into a fiber, characterized in that
   1. said first and second reactants are used in a ratio within the range of from 2:1 to 30:1 by volume in case said second reactant is borane and from 4:1 to 60:1 otherwise, and
   2. said high temperature pyrolysis is carried out at a temperature within the range of from 900°C to 1,200°C,
   whereby said layer of borosilicate is deposited in the form of radially oriented needles.

2. Method of claim 1 in which said ratio between reactants is in the range of from 2:1 to 4:1 in case said second reactant is borane and from 4:1 to 8:1 otherwise.

3. Method of claim 1 in which said ratio between reactants is varied over the range of 2:1 to 9:1 in case said second reactant is borane and from 4:1 to 18:1 otherwise.

4. Method of claim 1 in which said high temperature pyrolysis is carried out by means of flame pyrolysis.

5. Method of claim 1 in which said high temperature pyrolysis is carried out by means of infrared radiation.

6. Method of claim 1 in which said high temperature pyrolysis is carried out in a reaction furnace.

7. Method of claim 1 in which an inert carrier gas is used along with reactants.

8. Method of claim 7 in which said carrier gas is used in an amount relative to reactants of at least 10:1.

9. Method of claim 7 in which said carrier gas is selected from the group consisting of helium, nitrogen, and argon.

10. Method of claim 9 in which said carrier gas is helium constituting approximately 96 percent of the mixture of carrier gas and reactant gases.

11. Method of claim 1 in which said deposit is essentially three parts $SiO_2$ and one part $B_2O_3$.

12. Method of claim 1 in which said borosilicate is enriched in silica content prior to drawing by burning $B_2O_3$ out of the surface.

13. Method of claim 1 in which a protective layer of silica-enriched borosilicate is deposited on said borosilicate prior to drawing.

14. Method of claim 1 in which a protective layer of essentially pure silica is deposited on said borosilicate prior to drawing.

* * * * *